US008259754B2

United States Patent
Diaz Diaz et al.

(10) Patent No.: US 8,259,754 B2
(45) Date of Patent: Sep. 4, 2012

(54) LINE TERMINATION ARRANGEMENT WITH COMBINED BROADBAND AND NARROWBAND SERVICES

(75) Inventors: Victor Manuel Diaz Diaz, Madrid (ES); Maria Del Mar Perez Hernandez, Madrid (ES)

(73) Assignee: Alcatel Lucent, Paris (FR)

( * ) Notice: Subject to any disclaimer, the term of this patent is extended or adjusted under 35 U.S.C. 154(b) by 1393 days.

(21) Appl. No.: 11/557,967

(22) Filed: Nov. 8, 2006

(65) Prior Publication Data
US 2007/0147408 A1    Jun. 28, 2007

(30) Foreign Application Priority Data
Nov. 10, 2005   (EP) ..................................... 05300911

(51) Int. Cl.
*H04J 1/02* (2006.01)
(52) U.S. Cl. .................... 370/488; 370/497; 370/493
(58) Field of Classification Search .................. 370/242, 370/248; 379/93.05; 714/821
See application file for complete search history.

(56) References Cited

U.S. PATENT DOCUMENTS

| | | | |
|---|---|---|---|
| 6,219,409 B1 * | 4/2001 | Smith et al. ............... | 379/106.09 |
| 6,259,676 B1 * | 7/2001 | Kellock et al. ............. | 370/248 |
| 6,295,343 B1 | 9/2001 | Hjartarson | |
| 6,535,581 B2 * | 3/2003 | Singaliese ................. | 379/29.01 |
| 6,594,343 B1 | 7/2003 | Duffie et al. | |
| 6,856,682 B1 * | 2/2005 | Ham .......................... | 379/372 |
| 7,088,704 B1 * | 8/2006 | Byers et al. ................ | 370/352 |
| 7,145,990 B2 * | 12/2006 | Goodman ................... | 379/90.01 |
| 7,352,776 B1 * | 4/2008 | Hauptmann et al. ....... | 370/493 |
| 7,426,685 B2 * | 9/2008 | Schmitt et al. ............. | 714/821 |
| 2002/0181666 A1 * | 12/2002 | Singaliese ................. | 379/29.01 |
| 2003/0031312 A1 * | 2/2003 | Elo ............................ | 379/387.01 |
| 2003/0223375 A1 * | 12/2003 | Govreen-Segal ........... | 370/248 |
| 2004/0086110 A1 * | 5/2004 | Singaliese et al. .......... | 379/429 |
| 2005/0231882 A1 * | 10/2005 | Schmitt et al. ............. | 361/119 |
| 2009/0135808 A1 * | 5/2009 | Perez Hernandez et al. . | 370/352 |

FOREIGN PATENT DOCUMENTS

EP    1 175 077 A    1/2002

* cited by examiner

*Primary Examiner* — Chuong T Ho
(74) *Attorney, Agent, or Firm* — Harness, Dickey & Pierce, P.L.C.

(57) ABSTRACT

A combined line termination arrangement (1) for an access system supporting broadband transmission mode and narrowband transmission mode, the combined line termination arrangement (1) comprising a common interface device (4) having a common port (6) for receiving or transmitting a signal in said transmission modes and being connected to a first line card (2) and second line card (3). The common interface device further comprises a first switching means (10) for selectively closing and/or opening coupling paths to said first and second line cards and at least one bi-directional low pass filter (8) for and one bi-directional high pass filter (9) selective filtering the broadband and the narrowband signals to and from respective line terminations (LT1, LT2).

17 Claims, 2 Drawing Sheets

LINE TERMINATION ARRANGEMENT WITH COMBINED BROADBAND AND NARROWBAND SERVICES

This application is based on, and claims the benefit of, European Patent Application No. 05300911.4 filed on Nov. 10, 2005, which is incorporated by reference herein;

The present invention relates to a line termination arrangement, typically hosted in an access system of a communications network, that is capable of providing simultaneous broadband and narrowband access to end users in a combined manner.

In general terms, broadband is a type of communication capable of providing multiple channels over a single communications medium, typically using some form of frequency or wave division multiplexing at a rate at or above 128 Kbit/s; whereas narrowband is related to communication at a rate lower than 128 Kbit/s, for example at or below 64 Kbit/s.

Typical examples of broadband communication are the various modalities of the so-called digital subscriber line (DSL) communications. These modalities are distinguished from each other by different protocols they use for transmission such as ADSL (asymmetric DSL), HDSL (High rate DSL) VDSL (very high rate DSL) or SDSL (symmetric DSL). In general, all the various DSL transmission protocols are referred to as xDSL.

A typical example of narrowband communication is the communication of voice using the conventional telephony systems such the so-called plain old telephone service (POTS).

BACKGROUND OF THE INVENTION

As it is well known, in the present telecommunications environments, the demand is increasingly pointing toward the provision of greater bandwidth capacity. In the future waves of broadband deployment, service providers are likely to focus on offering a set, as complete as possible, of services in the various domains of voice, data and video to the very household of the end users. These services comprise, for example, video on demand (VoD), HDTV and broadcast TV services for all subscribers simultaneously. In order to achieve this goal broadband access capability is required on the same conventional network implemented for narrowband applications. This means that transmission is made at the broadband and the narrowband rates simultaneously each rate being used for a particular application, e.g. broadband for data communication and narrowband for voice communication.

The simultaneous transmission of broadband and narrowband brings about the need for combining the two types of signal into one in transmission and separating (splitting) the two types of signal into two independent signals at reception.

In the conventional practice, the task of combining and splitting the broadband and the narrowband signals is done by means of the so-called "splitters". A splitter is therefore a device used in telephony in order to split a telephone signal into two or more signals of different frequencies, or combine signals of different frequencies to form a single combined signal. Splitters are typically installed at central offices and may be needed at customer premises.

One drawback associated with the use of splitters is the wiring work involved in providing a subscriber to a new service is complicated and time consuming. Whenever a new service is activated, for example for providing xDSL service to a user who is already connected to POTS services, the subscriber loop needs to be rewired. This in turn, requires that a technician visits the respective service delivery site, for example a central office or a cabinet, in order to perform the rewiring tasks. The consequence is an increase in costs for providing the new service mainly due to manpower expenses, and perhaps loss of revenue as the service would become available after certain delay, namely only after the completion of the rewiring work.

In order to overcome the above drawbacks solutions have been proposed in order to simplify the use of splitters. One such solution comprises the use of combination line termination cards (hereinafter referred to as "combination cards"). These cards are adapted for combining broadband and narrowband transmissions without using external splitters. These units are single cards that handle both the narrowband access and the broadband access. In order to separate the high rate and the low rate signals from each other, without using an external splitter, combination cards use low pass and high pass filters incorporated inside them.

However, the combination cards also present important drawbacks. These drawbacks can be described within three basic categories:

i—the rigidity of the solution in terms of future evolution;
ii—the upfront investment required for their installation; and
iii—the impact on narrowband service availability caused by a failure in the broadband service.

These drawbacks are described in further details below:

i—As regards the rigidity of the solution, it is a well known fact in the related art that in a combination card, both the broadband electronics and the narrowband electronics are present in the same physical unit. While narrowband telephony is a very stable technology due to the fact that the existing networks and services need no—or very little—change for their continuing availability, and the operators tend to want to make their investment in such technology last as long as possible (dozens of years or even more); the broadband access technology is changing very rapidly. Furthermore, it is a well known fact that broadband access technology will very probably change significantly every 2-3 years. This strong tendency for change together with the overwhelming demand from the end users for new services, force the operators to replace the already installed plants relatively frequently in their effort to keep up with the fast-changing demand and be compliant with the requirements of the new systems to be installed.

Therefore, when broadband transmission/reception circuitry is combined in the same physical unit with narrowband transmission/reception circuitry, replacing the broadband part implies also replacing the narrowband part. As a consequence the related narrowband hardware that was intended for lasting many years is discarded, thus giving rise to an unnecessary loss in investment and installation costs.

ii—As regards upfront investment, it is known that the intended advantage of combination card solutions is that the operating expenditures would be reduced when a service is activated to a given user. However, with the integrated combination card solutions the investment already includes both broadband and narrowband hardware technologies from the outset, regardless of whether there would be an eventual need of both services. Thus if the user in question does not demand the combined service, the presence of both types of hardware in the unit gives rise to unnecessary expenditure.

iii—As regards service availability, it is well known that the narrowband telephony is regarded as a high availability service. A level of availability of about 99.999% is a common rate in the related industry. Broadband, on the other hand, has less stringent requirements. If in an integrated combination card the broadband part suffers a failure, the whole card needs to be replaced, thus resulting in the unavailability of the narrowband telephony service as well. The contrary would also be a drawback, namely any failure in the narrowband system, although less probable, would eventually impact the broadband service upon replacement of the single unit combination card.

In view of the above drawbacks, it is therefore desired to provide a line termination arrangement with combined broadband and narrowband services which overcomes the aforementioned drawbacks.

DESCRIPTION OF THE INVENTION

As described further above, the combination of narrowband and broadband functionalities provides the network operator with ability of activating and deactivating when required, any service on any subscriber line with a simple network management operation. The present invention proposes a solution for implementing this functionality while at the same time overcomes the aforementioned drawbacks of the known solutions. The solution proposed by the present invention is based on using two separate line cards, one for narrowband line termination and one for broadband line termination, the two line cards being coupled to a common interface device by means of separate connections. The common interface device is adapted for combining the two services, i.e. broadband and narrowband, into one single line, for example one single twisted-pair line from an access multiplexer to a main distribution frame. The common interface device is further designed in a way that allows for independent operation of the two line cards, while at the same time supports the so-called "soft provisioning" concept, namely the ability of switching on and off either one of the abovementioned services without requiring rewiring work on the subscriber loop.

Moreover, the common interface device comprises auxiliary switching arrangements which can serve as a flexibility point in the system thus allowing the incorporation of additional components or equipment, without major rework on the original system. For example, the common interface device may provide additional access connections for local loop unbundling scenarios (unbundling meaning the provision of access from a local exchange carrier to another service provider for use of a part of the network or network elements by the latter); or connections that allow a smooth plant migration from old telephone exchanges to new access systems, without interruption in the service.

Accordingly one object of the present invention is that of providing a common interface device for use in a combined line termination arrangement for an access system, the system being adapted for supporting broadband transmission mode as well as narrowband transmission mode, the combined line termination arrangement (1) comprising a first line termination and a second line termination, the first and second line terminations being connectable to a first line card for broadband transmission mode and a second line card for narrowband transmission mode, characterized in that the common interface device comprises:

a common port for receiving or transmitting a signal in one of said transmission mode or in a combination of said transmission modes,
a first coupling path for providing connection from the common port to the first line card through a bi-directional high pass filter in said first line termination,
a second coupling path for providing connection from the common port to the second line card,
a first switching means for selectively closing and/or opening the first and/or the second coupling paths, and
at least one bi-directional low pass filter disposed between the second line termination and the common port.

Another object of the present invention is that of providing a combined line termination arrangement for an access system, the system being adapted for supporting broadband transmission mode as well as narrowband transmission mode, the combined line termination arrangement comprising a first line termination and a second line termination, the first and second line terminations being connectable to a first line card for broadband transmission mode and a second line card for narrowband transmission mode, characterized in that the combined line termination arrangement further comprises a common interface device having:

a common port for receiving or transmitting a signal in one of said transmission mode or in a combination of said transmission modes,
a first coupling path for providing connection from the common port to the first line card,
a second coupling path for providing connection from the common port to the second line card,
a first switching means for selectively closing and/or opening the first and/or the second coupling paths,
at least one bi-directional high pass filter disposed between the first coupling path and the first line card, and
at least one bi-directional low pass filter disposed between the second line termination and the common port.

A further object of the present invention is that of providing a method for separating and/or combining signals of different bandwidth in a combined line termination arrangement for an access system, characterized in that said combined line termination arrangement comprises a common interface device for performing the steps of:

receiving or transmitting, at a common port, a signal in one of said transmission modes or in a combination of said transmission modes,
connecting, by means of a first coupling path, the common port to a first line card for broadband transmission mode,
connecting, by means of a second coupling path, the common port to a second line card for narrowband transmission mode,
selectively closing and/or opening, by means of a first switching means, the first and/or the second coupling paths,
filtering, by means of at least one bi-directional high pass filter disposed between the first coupling path and the first line card so as to block low frequency signals and let through high frequency signals, and
filtering, by means of at least one bi-directional low pass filter disposed between the second line card so as to block high frequency signals and let through low frequency signals.

These and further features of the present invention are explained in more detail in the following description as well as in the claims with the aid of the accompanying drawings.

EXAMPLES OF PREFERRED EMBODIMENTS

Figure 1:
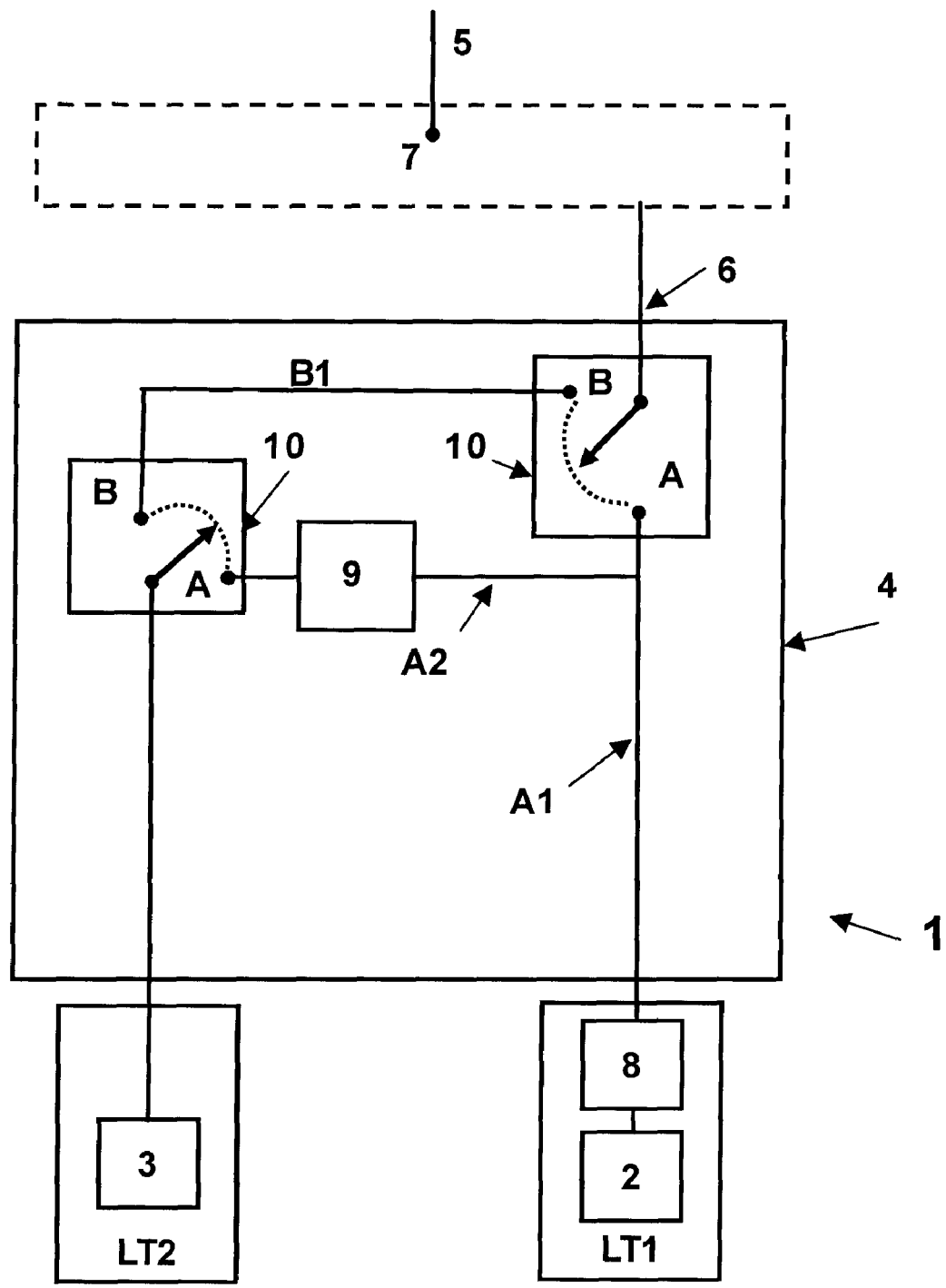
FIG. 1 is a schematic block diagram of a combined line termination arrangement according to a first embodiment of the present invention.

FIG. 1 shows a simplified schematic example of a block diagram of a combined multiservice line termination arrangement 1 according to a first embodiment of the present invention, for use in an access system. The combined line termination arrangement 1 comprises a first line termination LT1 having a first line card 2 adapted for transmitting and receiving signals in broadband transmission mode, and a second line termination LT2 having a second line card 3 adapted for transmitting and receiving signals in narrowband transmission mode. For example, the first (broadband) line termination LT1 may be adapted for supporting xDSL communication. The corresponding first (broadband) line card 2 may comprise an xDSL baseband circuit for providing connectivity with an xDSL modem as well as a high pass filter 8; and the second (narrowband) line termination LT2 may be adapted for supporting voice telephony, for example a POTS system. The corresponding second (narrowband) line card 3 may comprise a voice codec circuit in order to perform the necessary digital to analog conversion, or vice-versa, in order to adapt the signal for the POTS system, as well as interface circuitry.

The combined line termination arrangement 1 further comprises a common interface device 4 which is coupled, through separate coupling paths, to the first line termination LT1 and second line termination LT2. The common interface device 4 is further connected, through the common port 6 to the main subscriber line 5, for example through intermediate connection from the common interface device 4 to a main distribution frame 7 and from the latter to the main subscriber line 5.

The common interface device 4 comprises a low pass filter 9 and a first switching means 10, such as for example a relay or equivalent, for providing switching combinations as will be described in further detail below.

The low pass filter 9, as its name indicates, is adapted for allowing the passage of relatively low frequencies and for blocking frequencies which are in higher ranges. Typical values for the low frequencies are frequencies below 8 KHz.

Line termination LT1 further comprises a high pass filter 8 in order to block the low frequency signals. Thus the high pass filter 8 may be selected to block frequencies below 8 KHz.

Both filters 8 and 9 are bi-directional, namely they are capable of performing filtering operation in one direction of transmission or the other.

In order to provide additional flexibility points in signal routing, switching means is provided in the common interface device 4. As shown in FIG. 1, a first switching means 10 is placed in an interconnecting position with respect to the common port 6, first line termination LT1 and second line termination LT2, through low pass filter 9.

When the first switching means 10 is placed in position A, the common port 6 is directly connected to the first line termination LT1 through the coupling path A1 and is further connected by means of the coupling path A2 to the second line termination LT2 through the low pass filter 9.

In transmission, line termination 1, having the line card 2 transmits broadband signals to the common interface device 4 through the high pass filter 8. As the broadband signals are of high frequencies, the high pass filter allows a substantially complete passage of the signal through, which is then output from the common port 6. Low pass filter 9 blocks the passage of the broadband signal towards the line termination LT2.

On the other hand, the line termination LT2 transmits narrowband signals to the common interface device 4. These signals pass through the low pass filter 9 which allows a substantially complete passage of the narrowband signal which is then output at the common port 6. High pass filter 8 blocks the passage of the narrowband signal towards the line termination LT1.

In reception, a combined narrowband and broadband signal input at common port 6 in directed, through the coupling path A1, towards the first lines termination LT1 where the low frequency part of the combined signal is blocked at the high pass filter 8 and the high frequency signal is allowed to pass towards the broadband line card 2. The combined signal input at common port 6 also is fed, through the coupling path A2, to the low pass filter 9 which blocks the high frequency signals and allows the passage of the low frequency signals towards the second line termination LT2 and thus towards the narrowband line card 3.

Therefore in this arrangement both the broadband and narrowband transmission and receptions modes are available.

However, situations may arise where the broadband service provided by the first line termination LT1 needs to be interrupted, for example because the existing broadband service needs to be replaced by a service based on a newly developed broadband technology; or where there is a need to provide connectivity with an external broadband equipment to the subscriber line, while maintaining unchanged the narrowband service provision from the line termination LT2.

In such cases, the switching means 10 may be placed in position B, where the first line card LT1 is disconnected from the common port 6 and the common interface device 4 only operates with narrowband services through the coupling path B1. In this arrangement also, the low pass filter 9 serves for blocking any incoming high frequency signal while the broadband service is delivered or received from an external system (not shown).

Figure 2:
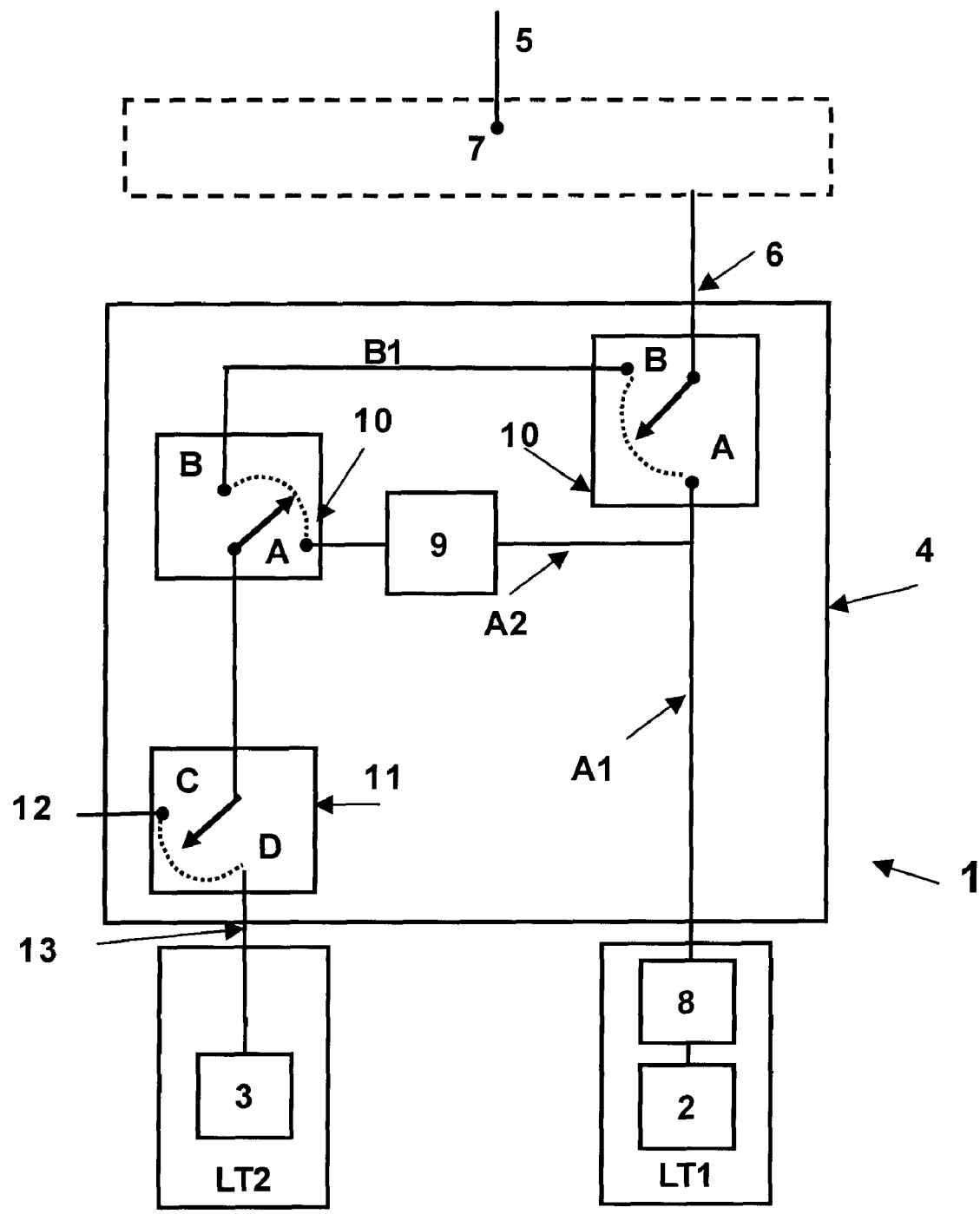
FIG. 2 is a schematic block diagram of a combined line termination arrangement according to a second embodiment of the present invention.

FIG. 2 shows a further embodiment of the present invention wherein a second switching means 11 is used. In this figure, features similar to those of FIG. 1 are given the same reference numerals.

An example of a situation where a second switching means may be necessary is where there is a need to provide a smooth migration from old equipment (e.g. local exchanges) to the new equipment. In such a case, it may be assumed that the old local exchange subscriber line is connected to connection port 12 of the common interface device 4 through connection point C of the second switching means 11. Broadband service from the first line termination LT1 is activated or deactivated, based on the specific requirements of each application, by changing the position of switching means 10 as previously described in relation to FIG. 1.

Therefore, in case it is desired to perform a full migration operation from an old local exchange to a new equipment, for example in order to decommission the old local exchange, the operation can be performed by a simple change in the position of the second switching means 11 from position C to position D without a need to visit the respective site. In position D, connectivity is provided through connection port 13 towards the newly connected line termination LT2 provides narrowband service using the narrowband line card 3 as previously described in relation to FIG. 1.

It is therefore clearly shown that the present invention provides an efficient solution for combining signals of different type for transmission and separating signals of different type combined in one into separate signals, using separate line cards that operate independently from each other.

In this manner it becomes possible to connect and disconnect at will and very easily, a subscriber line to a narrowband line card or to a broadband line card, or to both. The connection and disconnection may be commanded by any known network management procedure from a convenient point of the network which could be at a distance, without the need of on site visits by a technician.

The proposed invention provides important advantages, among which the following are noted:

Flexibility in the sense that network operators have the possibility of controlling their capital expenditure according to their needs. For example they can choose as to whether they prefer to opt for a complete investment upfront or they prefer to perform a "seeding" operation according to which one service (e.g. broadband) is deployed in the network initially, and at a later stage when the network planning or the demand so requires, the second service is deployed (e.g. narrowband in an exchange replacement scenario).

Evolution in the sense that if broadband access technology evolves and requires replacement of the installed base, the broadband line terminations can be replaced without disturbing the narrowband service.

Fault independence because the operation of the two line cards is independent of each other; therefore failure of one line card (broadband or narrowband) does not impact the service provided by the other one.

The invention claimed is:

1. A common interface device for use in a combined line termination arrangement for an access system, the access system being configured to support a broadband transmission mode and a narrowband transmission mode, the combined line termination arrangement including a first line termination and a second line termination, the first and second line terminations being connectable to a first line card for broadband transmission mode and a second line card for narrowband transmission mode, the common interface device comprising:
a common port configured to at least one of receive and transmit a signal in at least one of the broadband transmission mode and the narrowband transmission mode;
a first coupling path configured to provide a connection from the common port to the first line card through a bi-directional high pass filter in said first line termination;
a second coupling path configured to provide a connection from the common port to the second line card through a bi-directional low-pass filter;
a third coupling path configured to provide a connection from the common port to the second line card; and
a first switching structure including a first connection configuration and a second connection configuration, wherein the first connection configuration is configured to select the first coupling path and the second coupling path, and the second connection configuration is configured to select the third coupling path,
wherein in a first switching position the first connection configuration is configured to connect both the first and the second line terminations to the common port, and in a second switching position the second connection configuration is configured to disconnect the broadband transmission mode from the common port.

2. The common interface device according to claim 1, further comprising:
a second switching structure configured to selectively connect at least one of the second coupling path and the third coupling path to one of a first connection port and a second connection port.

3. The common interface device according to claim 2, wherein
the first and the second switching structures are in a combined position, and
both the first and the second line terminations are disconnected from the common port, thereby providing a connection from the common port to an external equipment through the first connection port.

4. The common interface device according to claim 2, wherein
the first and the second switching structures are in a combined position, and
the second line termination is disconnected from the common port, thereby providing a connection from the common port to an external equipment through the first connection port, the external equipment being configured to provide narrowband transmission and to be combined with broadband transmission provided through the first line termination.

5. The common interface device according to claim 1, wherein
the bi-directional high pass filter is configured to block frequencies substantially at or below 8 KHZ, and
the at least one bi-directional low pass filter is configured to block frequencies substantially at or above 8 KHz.

6. A combined line termination arrangement for an access system, the access system being configured to support a broadband transmission mode and a narrowband transmission mode, the combined line termination arrangement comprising:
a first line termination and a second line termination, the first and second line terminations being connectable to a first line card for broadband transmission mode and a second line card for narrowband transmission mode; and
the common interface device of claim 1.

7. The common interface device according to claim 1, wherein the third coupling path does not include one of a high pass filter and a low pass filter.

8. A method for at least one of separating and combining signals of different bandwidth in a combined line termination arrangement for an access system, the method comprising:
one of receiving and transmitting, at a common port, a signal in at least one of a broadband transmission mode and a narrowband transmission mode,
connecting, via a first coupling path, the common port to a first line card for broadband transmission mode,
connecting, via a second coupling path, the common port to a second line card through a bi-directional low-pass filter,
connecting, via a third coupling path, the common port to the second line card for narrowband transmission mode,
selectively opening and closing, by a first switching structure in a first connection configuration, the first coupling path and the second coupling path,
selectively opening and closing, by the first switching structure in a second connection configuration, the third coupling path,
filtering, by at least one bi-directional high pass filter disposed between the first coupling path and the first line card so as to block low frequency signals and let through high frequency signals, and
filtering, by at least one bi-directional low pass filter disposed in the second coupling path between the common port and the second line card so as to block high frequency signals and let through low frequency signals,
wherein in a first switching position the first connection configuration is configured to connect both a first and a second line terminations to the common port, and in a second switching position the second connection configuration is configured to disconnect the broadband transmission mode from the common port.

9. The method according to claim 8 further comprising:
selectively connecting, by a second switching structure, at least one of the second coupling path and the third coupling path to at least one of a first connection port and a second connection port.

10. The method according to claim 8, further comprising:
receiving from the first line card the broadband transmission mode signal,
receiving from the second line card the narrowband transmission mode signal, and
combining the broadband transmission mode signal and the narrowband transmission mode signal into one single combined signal for transmission at a common port.

11. The method according to claim 10, wherein the separating the received single signal into the broadband transmission mode signal and the narrowband transmission mode signal includes,
filtering the received signal through the bi-directional low pass filter, and
providing the low pass filtered signal to the second line card, and
filtering the received signal through the bi-directional high pass filter and providing the high pass filtered signal to the first line card.

12. The method according to claim 8, further comprising:
receiving a single signal being a combination of a broadband transmission mode signal and the narrowband transmission mode signal, and
separating the received single signal into the broadband transmission mode signal and the narrow band transmission mode signal.

13. A common interface device for use in a combined line termination arrangement for an access system, the access system being configured to support a broadband transmission mode and a narrowband transmission mode, the combined line termination arrangement including a first line termination and a second line termination, the first and second line terminations being connectable to a first line card for broadband transmission mode and a second line card for narrowband transmission mode, the common interface device comprising:
a common port configured to at least one of receive and transmit a signal in at least one of the broadband transmission mode and the narrowband transmission mode;
a first coupling path configured to provide a connection from the common port to the first line card through a bi-directional high pass filter in said first line termination;
a second coupling path configured to provide a connection from the common port to the second line card through a bi-directional low-pass filter;
a third coupling path configured to provide a connection from the common port to the second line card;
a first switching structure including a first connection configuration and a second connection configuration, wherein the first connection configuration is configured to select the first coupling path and the second coupling path, and the second connection configuration is configured to select the third coupling path; and
a second switching structure configured to selectively connect at least one of the second coupling path and the third coupling path to one of a first connection port and the second line card.

14. The common interface device according to claim 13, wherein
in a first switching position the first connection configuration is configured to connect both the first and the second line terminations to the common port, and
in a second switching position the second connection configuration is configured to disconnect the broadband transmission mode from the common port.

15. The common interface device according to claim 13, wherein
the first and the second switching structures are in a combined position, and
both the first and the second line terminations are disconnected from the common port, thereby providing connection from the common port to an external equipment through the first connection port.

16. The common interface device according to claim 13, wherein
the first and the second switching structures are in a combined position, and
the second line termination is disconnected from the common port, thereby providing a connection from the common port to an external equipment through the first connection port, the external equipment being configured to provide narrowband transmission and to be combined with broadband transmission provided through the first line termination.

17. The common interface device according to claim 13, wherein
the bi-directional high pass filter is configured to block frequencies substantially at or below 8 KHZ, and
the at least one bi-directional low pass filter is configured to block frequencies substantially at or above 8 KHz.

* * * * *